US006085399A

United States Patent [19]

Fileccia

[11] Patent Number: 6,085,399

[45] Date of Patent: Jul. 11, 2000

[54] SOCKET SEPARATING DEVICE

[76] Inventor: Anthony Fileccia, 204 N. Hawthorne St., N. Massapequa, N.Y. 11758

[21] Appl. No.: 09/193,805

[22] Filed: Nov. 17, 1998

[51] Int. Cl.[7] ...... B23P 19/04

[52] U.S. Cl. ...... 29/239; 29/257

[58] Field of Search ...... 29/239, 253, 257

[56] References Cited

U.S. PATENT DOCUMENTS

| | | | |
|---|---|---|---|
| 533,426 | 2/1895 | Bartzen . | |
| 1,242,392 | 10/1917 | Underwood | 29/239 |
| 2,664,620 | 1/1954 | Beasley | 29/239 |
| 3,742,570 | 7/1973 | Felser | 29/257 |
| 4,068,365 | 1/1978 | Brandt . | |
| 4,649,614 | 3/1987 | Lund | 29/257 |
| 4,649,615 | 3/1987 | Hundley . | |
| 5,199,333 | 4/1993 | Snyder, Jr. . | |
| 5,586,378 | 12/1996 | Smith | 29/257 |
| 5,713,117 | 2/1998 | Bliss | 29/257 |

*Primary Examiner*—David A. Scherbel
*Assistant Examiner*—Daniel G. Shanley
*Attorney, Agent, or Firm*—Goldstein & Canino

[57] ABSTRACT

A socket separating device including a frame member having a generally U-shaped configuration. The frame member is further defined by a horizontal segment and a pair of opposed vertical segments. One of the vertical segments has an enlarged upper end. The enlarged upper end has a horizontally oriented threaded bore extending therethrough. An upper end of the vertical segment without the enlarged upper end has a pin swively disposed therein and extending outwardly therefrom towards the opposed vertical segment. A primary separating tool couples with the pin of the frame member. The primary separating tool receives a ball socket. A secondary separating tool extends through the threaded bore of the enlarged end of the frame member and extends toward the primary separating tool. The secondary separating tool serves to aid in separating ball sockets with the primary separating tool.

6 Claims, 2 Drawing Sheets

SOCKET SEPARATING DEVICE

BACKGROUND OF THE INVENTION

1. Field of the Invention

The present invention relates to a socket separating device and more particularly pertains to separating the socket ends on various automotive and machine components with a socket separating device.

2. Description of the Prior Art

The use of separating tools is known in the prior art. More specifically, separating tools heretofore devised and utilized for the purpose of repairing machinery are known to consist basically of familiar, expected and obvious structural configurations, notwithstanding the myriad of designs encompassed by the crowded prior art which have been developed for the fulfillment of countless objectives and requirements.

By way of example, U.S. Pat. No. 533,426 to Bartzen; U.S. Pat. No. 5,199,333 to Snyder, Jr.; U.S. Pat. No. 4,068,365 to Brandt; and U.S. Pat. No. 4,649,615 to Hundley.

While these devices fulfill their respective, particular objective and requirements, the aforementioned patents do not describe a socket separating device for separating the socket ends on various automotive and machine components.

In this respect, the socket separating device according to the present invention substantially departs from the conventional concepts and designs of the prior art, and in doing so provides an apparatus primarily developed for the purpose of separating the socket ends on various automotive and machine components.

Therefore, it can be appreciated that there exists a continuing need for new and improved socket separating device which can be used for separating the socket ends on various automotive and machine components. In this regard, the present invention substantially fulfills this need.

SUMMARY OF THE INVENTION

In the view of the foregoing disadvantages inherent in the known types of separating tools now present in the prior art, the present invention provides an improved socket separating device. As such, the general purpose of the present invention, which will be described subsequently in greater detail, is to provide a new and improved socket separating device and method which has all the advantages of the prior art and none of the disadvantages.

To attain this, the present invention essentially comprises a frame member having a generally U-shaped configuration. The frame member is further defined by a horizontal segment and a pair of opposed vertical segments. The opposed vertical segments extend upwardly from opposed ends of the horizontal segment. One of the vertical segments has an enlarged upper end. The enlarged upper end has a horizontally oriented threaded bore extending therethrough. Each of the vertical segments have triangular support members disposed on lower ends thereof. An upper end of the vertical segment without the enlarged upper end has a pin swively disposed therein and extending outwardly therefrom towards the opposed vertical segment. A primary separating tool couples with the pin of the frame member. The primary separating tool has a generally U-shaped configuration. The primary separating tool has a horizontal component with a bore formed therein for receiving the pin. The primary separating tool has a pair of tapered arms extending outwardly from the horizontal component. The pair of tapered arms each terminate in a point. The pair of tapered arms have a space disposed therebetween for receiving a ball socket therein. A secondary separating tool extends through the threaded bore of the enlarged upper end of the frame member and extends toward the primary separating tool. The secondary separating tool is comprised of an elongated threaded rod. An outer end of the threaded rod has an enlarged hexagonal head formed thereon. The threaded rod has a hole formed in an inner end thereof. The hole receives a cleat therein. The cleat serves to aid in separating ball sockets with the primary separating tool.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved socket separating device which has all the advantages of the prior art separating tools and none of the disadvantages.

It is another object of the present invention to provide a new and improved socket separating device which may be easily and efficiently manufactured and marketed.

It is a further object of the present invention to provide a new and improved socket separating device which is of durable and reliable construction.

An even further object of the present invention is to provide a new and improved socket separating device which is susceptible of a low cost of manufacture with regard to both materials and labor, and which accordingly is then susceptible of low prices of sale to the consuming public, thereby making such a socket separating device economically available to the buying public.

Even still another object of the present invention is to provide a new and improved socket separating device for separating the socket ends on various automotive and machine components.

Lastly, it is an object of the present invention to provide a new and improved socket separating device including a frame member having a generally U-shaped configuration. The frame member is further defined by a horizontal segment and a pair of opposed vertical segments. One of the vertical segments has an enlarged upper end. The enlarged upper end has a horizontally oriented threaded bore extending therethrough. An upper end of the vertical segment without the enlarged upper end has a pin swively disposed therein and extending outwardly therefrom towards the opposed vertical segment. A primary separating tool couples with the pin of the frame member. The primary separating tool receives a ball socket. A secondary separating tool extends through the threaded bore of the enlarged end of the frame member and extends toward the primary separating tool. The secondary separating tool serves to aid in separating ball sockets with the primary separating tool.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
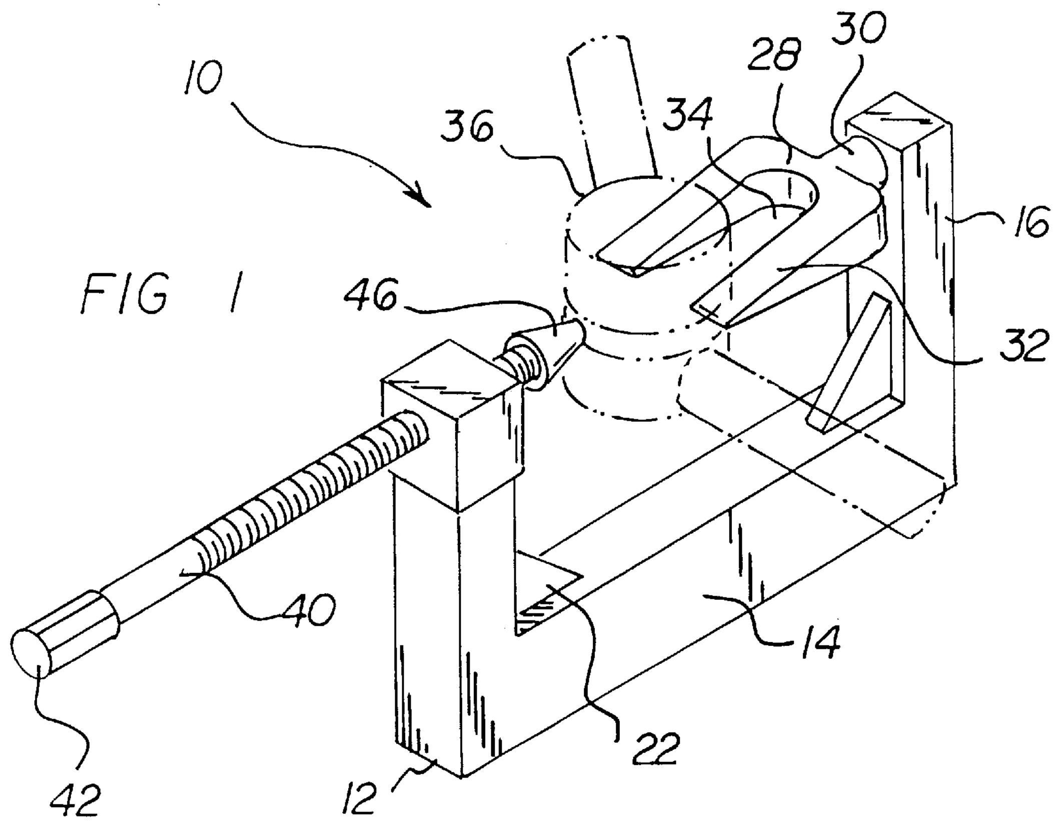
FIG. 1 is a perspective view of the preferred embodiment of the socket separating device constructed in accordance with the principles of the present invention.
Figure 2:
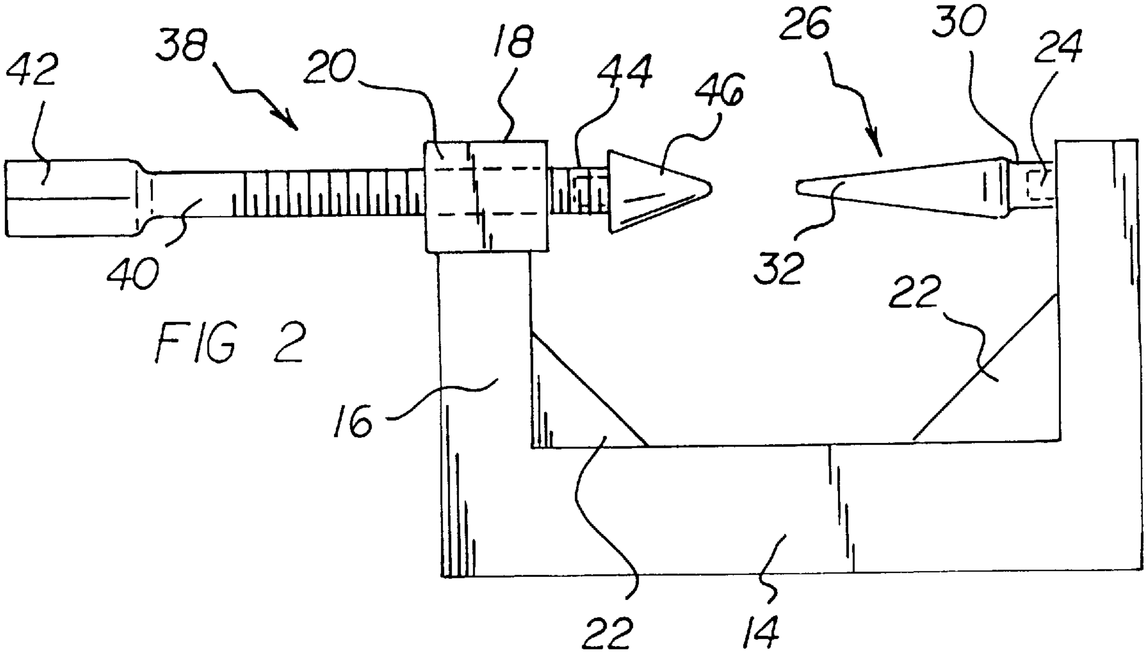
FIG. 2 is a side elevation view of the present invention.
Figure 3:
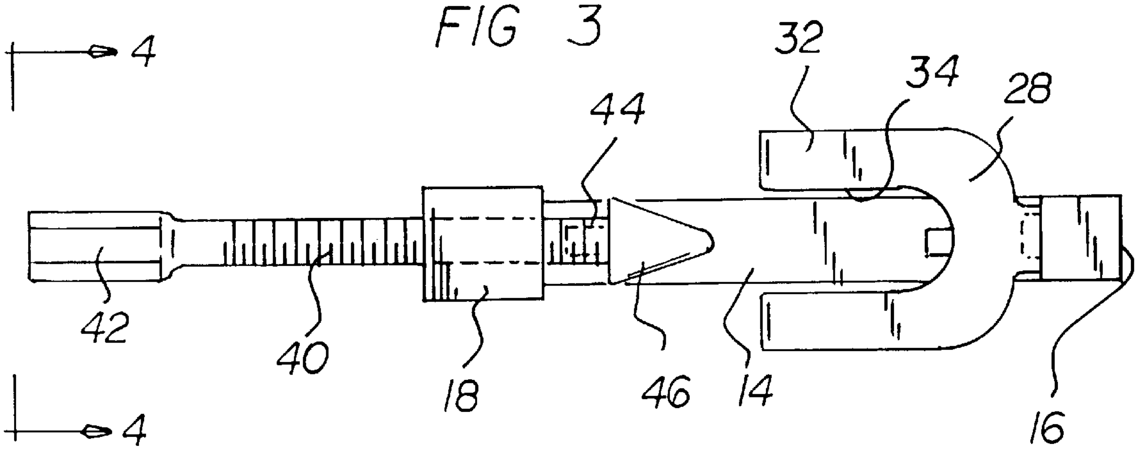
FIG. 3 is a top plan view of the present invention.
Figure 4:
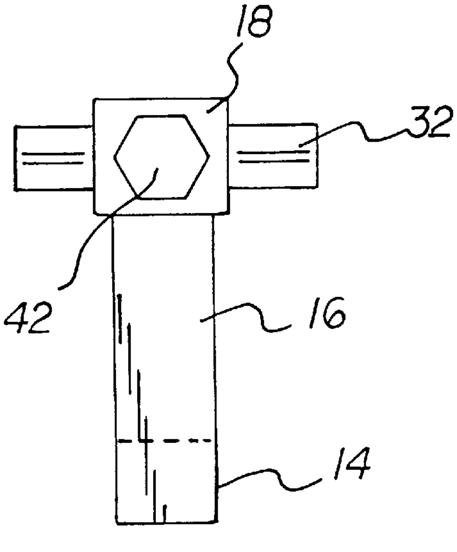
FIG. 4 is a front view of the present invention as taken along line 4—4 of FIG. 3.

With reference now to the drawings, and in particular, to FIGS. 1 through 4 thereof, the preferred embodiment of the new and improved socket separating device embodying the principles and concepts of the present invention and generally designated by the reference number 10 will be described.

Specifically, it will be noted in the various Figures that the device relates to a socket separating device for separating the socket ends on various automotive and machine components. In its broadest context, the device consists of a frame member, a primary separating tool, and a secondary separating tool. Such components are individually configured and correlated with respect to each other so as to attain the desired objective.

The frame member 12 has a generally U-shaped configuration. The frame member 12 is further defined by a horizontal segment 14 and a pair of opposed vertical segments 16. The horizontal segment 14 is provided with a planar lower surface to allow for the device to balance on a flat surface, such as a table or the like. The opposed vertical segments 16 extend upwardly from opposed ends of the horizontal segment 14. One of the vertical segments 16 has an enlarged upper end 18. The enlarged upper end 18 has a horizontally oriented threaded bore 20 extending therethrough. Each of the vertical segments 16 have triangular support members 22 disposed on lower ends thereof. The support members 22 are positioned between the vertical segments 16 and the horizontal segment 14 to provide added strength to the device 10. An upper end of the vertical segment 16 without the enlarged upper end 18 has a pin 24, outlined in shadow, swively disposed therein and extending outwardly therefrom towards the opposed vertical segment. Note FIG. 2.

The primary separating tool 26 couples with the pin 24 of the frame member 12. The primary separating tool 26 has a generally U-shaped configuration. The primary separating tool 26 has a horizontal component 28 with a bore 30 formed therein for receiving the pin 24. The primary separating tool 26 has a pair of tapered arms 32 extending outwardly from the horizontal component 28. The pair of tapered arms 32 each terminate in a point. The pair of tapered arms 32 have a space 34 disposed therebetween for receiving a ball socket 36 therein.

The secondary separating tool 38 extends through the threaded bore 20 of the enlarged upper end 18 of the frame member 12 and extends toward the primary separating tool 26. The secondary separating tool 38 is comprised of an elongated threaded rod 40. An outer end of the threaded rod 40 has an enlarged hexagonal head 42 formed thereon. The enlarged hexagonal head 42 allows for the attachment of a socket tool to aid in the use of the device 10 described in greater detail hereinafter. The threaded rod 40 has a hole 44 formed in an inner end thereof. The hole 44 receives a cleat 46 therein. The cleat 46 serves to aid in separating ball sockets 36 with the primary separating tool 26.

In use, the device 10 will separate the socket ends on various automotive and machine components, i.e., tie rod ends and pitman arms, etc. The first step is to insert the primary separating tool 26 between the ball sockets 36. Next, the primary separating tool 26 is secured to the pin 24 of the frame member 12. The threaded rod 40 of the secondary separating tool 38 is then tightened so that the cleat 46 extends toward the ball sockets 36. The cleat 46 will pry the ball sockets 36 apart as the threaded rod 40 is tightened.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A socket separating device for separating the socket ends on various automotive and machine components comprising, in combination:

a frame member having a generally U-shaped configuration, the frame member being further defined by a horizontal segment and a pair of opposed vertical segments, the opposed vertical segments extending upwardly from opposed ends of the horizontal segment, one of the vertical segments having an enlarged upper end, the enlarged upper end having a horizontally oriented threaded bore extending therethrough, each of the vertical segments having triangular support members disposed on lower ends thereof, an upper end of the vertical segment without the enlarged upper end having a pin swively disposed therein and extending outwardly therefrom towards the opposed vertical segment;

a primary separating tool coupling with the pin of the frame member, the primary separating tool having a generally U-shaped configuration, the primary separating tool having a horizontal component with a bore formed therein for receiving the pin, the primary separating tool having a pair of tapered arms extending outwardly from the horizontal component, the pair of tapered arms each terminating in a point, the pair of tapered arms having a space disposed therebetween for receiving a ball socket therein;

a secondary separating tool extending through the threaded bore of the enlarged end of the frame member and extending toward the primary separating tool, the secondary separating tool being comprised of an elongated threaded rod, an outer end of the threaded rod having an enlarged hexagonal head formed thereon, the threaded rod having a hole formed in an inner end thereof, the hole receiving a cleat therein, the cleat serving to aid in separating ball sockets with the primary separating tool.

2. A socket separating device for separating the socket ends on various automotive and machine components comprising, in combination:

a frame member having a generally U-shaped configuration, the frame member being further defined by a horizontal segment and a pair of opposed vertical segments, one of the vertical segments having an enlarged upper end, the enlarged upper end having a horizontally oriented threaded bore extending therethrough, an upper end of the vertical segment without the enlarged upper end having a pin swively disposed therein and extending outwardly therefrom towards the opposed vertical segment;

a primary separating tool coupling with the pin of the frame member, the primary separating tool receiving a ball socket;

a secondary separating tool extending through the threaded bore of the enlarged end of the frame member and extending toward the primary separating tool, the secondary separating tool serving to aid in separating ball sockets with the primary separating tool.

3. The socket separating device as set forth in claim 2 wherein each of the vertical segments of the frame member have triangular support members disposed on lower ends thereof.

4. The socket separating device as set forth in claim 2 wherein the primary separating tool has a generally U-shaped configuration, the primary separating tool having a horizontal component with a bore formed therein for receiving the pin, the primary separating tool having a pair of tapered arms extending outwardly from the horizontal component, the pair of tapered arms each terminating in a point, the pair of tapered arms having a space disposed therebetween for receiving a ball socket therein.

5. The socket separating device as set forth in claim 2 wherein the secondary separating tool is comprised of an elongated threaded rod, the threaded rod having a hole formed in an inner end thereof, the hole receiving a cleat therein, the cleat serving to aid in separating ball sockets with the primary separating tool.

6. The socket separating device as set forth in claim 5 wherein an outer end of the threaded rod has an enlarged hexagonal head formed thereon.

* * * * *